United States Patent [19]
Gasser

[11] Patent Number: 5,522,686
[45] Date of Patent: Jun. 4, 1996

[54] SELF-BORING BLIND RIVET

[75] Inventor: Daniel Gasser, Rebstein, Switzerland

[73] Assignees: SFS Rhomberg Gesellschaft m.b.H., Klaus, Austria; SFS Stadler Holding AG., Heerbrugg, Switzerland

[21] Appl. No.: 104,102

[22] PCT Filed: Dec. 10, 1992

[86] PCT No.: PCT/EP92/02860

§ 371 Date: Aug. 13, 1993

§ 102(e) Date: Aug. 13, 1993

[87] PCT Pub. No.: WO93/12347

PCT Pub. Date: Jun. 24, 1993

[30] Foreign Application Priority Data

Dec. 18, 1992 [DE] Germany ............... 41 41 915.4

[51] Int. Cl.$^6$ .................................................. F16B 13/04
[52] U.S. Cl. ............................................. 411/29; 408/226
[58] Field of Search ................................ 411/29, 69, 55, 411/43; 408/226

[56] References Cited

U.S. PATENT DOCUMENTS

| 369,248 | 8/1887 | Johnson | 408/226 |
| 3,935,786 | 2/1976 | Murray | 411/29 |
| 4,245,544 | 6/1981 | Freeman | 411/29 |
| 4,629,380 | 12/1986 | Gunkel et al. | |
| 4,920,837 | 5/1990 | Phillips | 408/226 |
| 5,183,357 | 2/1993 | Palm | 411/29 |
| 5,256,017 | 10/1993 | Smirnov | 411/43 |

FOREIGN PATENT DOCUMENTS

| 664262 | 5/1965 | Belgium | 411/55 |
| 344121 | 5/1989 | European Pat. Off. | 408/226 |
| 4003373 | 5/1991 | Germany . | |
| 4119934 | 12/1992 | Germany . | |
| 755622 | 8/1956 | United Kingdom | 408/226 |

*Primary Examiner*—Flemming Saether
*Attorney, Agent, or Firm*—Helfgott & Karas

[57] ABSTRACT

A self-drilling blind tension rivet has a sleeve with a stop flange and a rivet shank and having at one end a drilling unit and at the other end a flattened section for engagement with a rotation and tension applying tool for drilling in and setting the blind tension rivet. The flattened section which extends over the major part of the length of the shank has roughened surfaces formed by transverse ribs and is limited by two elongated portions protruding radially beyond the outer diameter of a cylindrical part of the shank.

4 Claims, 1 Drawing Sheet

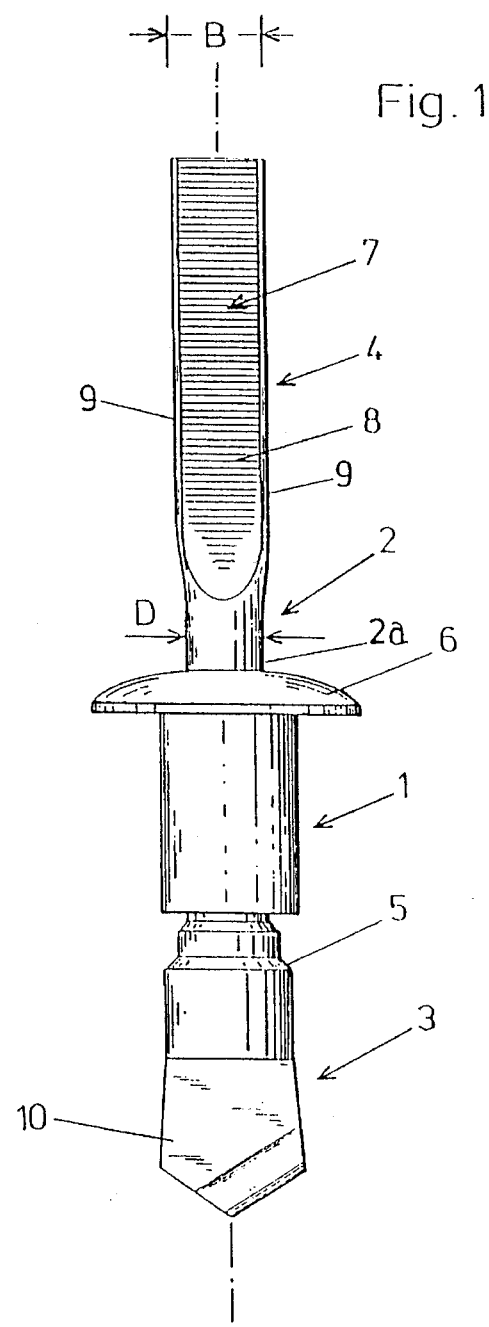
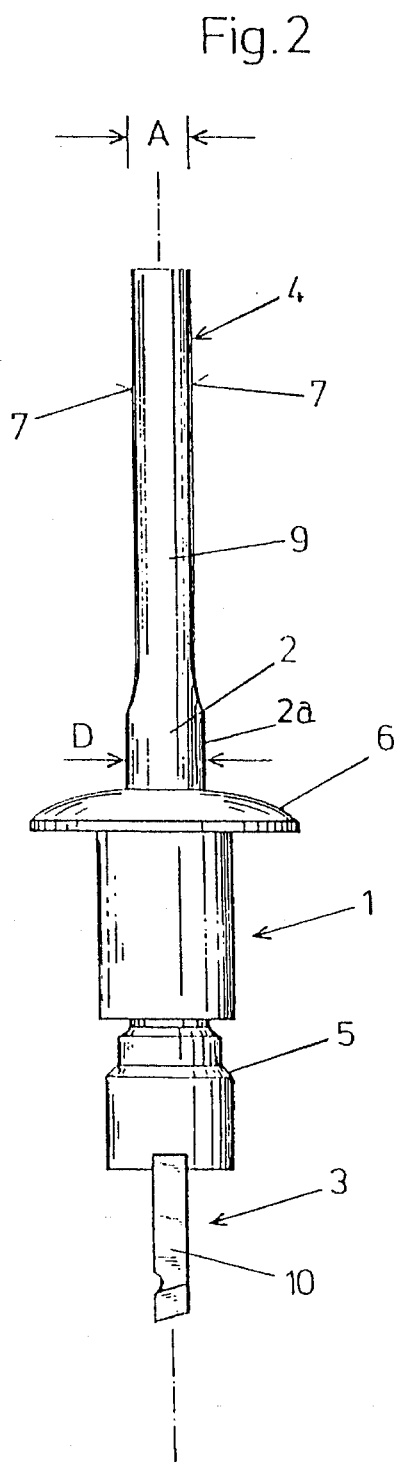

SELF-BORING BLIND RIVET

BACKGROUND OF THE INVENTION

The invention pertains to a self-drilling blind tension rivet which includes a rivet casing with a stop flange and a rivet spindle on one end of which a drilling unit is provided, and at other end region of which at least one rotation and tension force application element is provided to apply force by rotation and tensioning of a tool for drilling and setting the blind tension rivet.

Self-drilling blind rivets have already become known in various designs. For example, a self-drilling blind rivet is known from DE-A-2,554,557, where the rivet spindle or shank has over its entire length two parallel surfaces that extend along the spindle where the rivet casings or sleeves have surfaces complimentary to the surface of the spindle, in order to achieve a torsion-locked connection between the rivet spindle and the rivet casing. On the one hand, a special construction of the rivet casing is recruited, whereby the rivet spindle and the rivet casing must be precisely tailored to fit each other. On the other hand, immediately upon setting of the rivet, that is, upon application of tensioning movements, problems arise. When setting a tightened blind rivet relatively large forces, acting in the axial direction of the tensioning spindle, must be applied, so that a fixed clamping of the rivet spindle in an appropriate tool is necessary.

The same problems arise in a design of a self-drilling rivet disclosed in DE-A-2,548,860 where the rivet spindle has a quadratic cross-section. In this design as well, it is intended that a rotation-locked connection be established between the rivet spindle and the rivet casing, and thus here too, a special design of the open area cross section of the rivet casing will be needed.

SUMMARY OF THE INVENTION

It is an object of the present invention to provide a self-drilling blind rivet which would ensure a simple installation of the end region of the tensioning spindle thereof in a tool and, on the other hand, it will enable the transfer of the tensioning forces when setting an optimal clamping action on the tool.

According to the invention, the tensioning shank or spindle of the rivet has at least one protrusion, or similarly designed force application section at its end region having the rotational and tensioning force application element that emanates from the free end and passes across at least a portion of the length of the free projecting region over the rivet sleeve, said protrusion running over the cross section of the section of the tensioning shank and parallel to the axis of the tensioning shank. The section for force application is provided over at least a part of its surface with roughening, transverse ribs, undulations, knobs, or a knurled edge.

In this manner the rivet shank can be pushed into the tool with no problems, since no back-cutting is necessary as for the other known designs. Due to the protrusions or similar elements protruding radially over the cross-section of the shank, a sufficiently good rotational engagement of the tensioning shank with the tool will occur during the drilling process. Precisely due to the formation of at least one partial section of the section for the force application with toughening, transverse ribs, undulations, knobs or a knurled edge, no particularly large radial clamping forces are needed for the rivet shank in order to transfer the relatively large axial forces when setting the tension blind rivet. Therefore, a simple pressing of the corresponding tool parts onto the section of the tensioning shank for the force application suffices to achieve a sufficient friction force due to the surface configuration of the corresponding partial section or a partial force-closed connection when setting the rivet.

Due to the special design of the tensioning section of the shank it will suffice, for example, to provide clamping jaws that are held spring-loaded in a conical portion of the tool.

One particularly simple design is obtained when the section for force application has two diametrically opposing protrusions, or similar features, and its cross section is designed roughly at a right angle to the axis of the rivet. It is particularly advantageous that the section for force application has a width (measured transversely with respect to the axial direction) which is greater than the diameter of the rivet shank and a thickness (measured at a right angle to the axis) that is smaller than the diameter of the tensioning shank.

Therefore, during the drilling process, relatively large surfaces for force application will be provided for the rotation with two diametrically opposing protrusions or portions or similar features. Moreover, relatively large surfaces will be available that are equipped with roughening, transverse ribs, undulations, knobs, or a knurled edge, and are suitable for the transfer of tensile forces when setting the rivet. It is advantageous that the entire device has a consistent cross section throughout, and the end region of the tensioning shank is designed as a surface for force application, emanating practically from its free end, so that a simple insertion of the rivet spindle or shank into an appropriate tool will be always possible.

According to an embodiment of the present invention the width of the section for force application is at least 1.2 times the diameter of the tensioning shank. This will assure not only an excellent rotational lock for the transfer of the necessary torque when drilling, but also the advantage is achieved that the rivet sleeve does not need to be separately secured against lost even when it is only loosely placed onto the tensioning shank and slides axially along a partial region.

According to another embodiment, parallel to the protrusions, or similar elements on the section for force application, one or more grooves or channels are provided on the tensioning shank. Thus for the rotational lock, it is possible to adapt the shank to even special tools, where an excellent force application is possible for the tensioning motion due to a corresponding larger surface in conjunction with the roughening, transverse ribs, or similar features provided on the surface.

According to yet another embodiment, protrusions, or similar elements formed on the section for force application are formed by partial protrusions following each other in an axial direction. These protrusions, or similar elements thus form not only an optimal potential structure for force application in a rotational drive, but due to the recesses formed between the partial protrusions, they will also provide an excellent potential structure for force application during the tightening movement.

It is further advantageous if the section for force application is produced by pressing the end region of the tensioning shank after the preassembly of the rivet sleeve. Thus, the free end region of the section for force application can be deformed after the assembly of the rivet sleeve accordingly, so that the rivet sleeve itself can have a cylindrical drilled hole in the usual manner, and thus will be held easily sliding and rotating on the tensioning shank. Due to this holding of the rivet sleeve, it is also possible, without any problems, to produce a rivet sleeve with a painted or colored surface. Due to the excellent rotational lock in the region of the tensioning shank, there is no need to make use of the rivet sleeve for the transfer of torque. The rivet sleeve during the drilling process will not rotate since it is sitting loosely on the tensioning shank. In addition, the surface of the part being attached, and also the stop flange of the rivet sleeve itself will not be damaged by any means at the end of the drilling process. Paint applied to the rivet sleeve and to the part being attached thus will not peel off. Due to the loose holding of the rivet sleeve it is also possible to provide the stop flange with any kind of head shape.

Due to the subsequent deformation of the end region of the tensioning shank, an optimum proof against loosing the attached parts will be provided for the rivet sleeve, so that in addition, the optimum cross-sectional shape of the section for force application can be produced.

Additional advantages of the present invention will be explained in greater detail below with reference to the drawings.

DETAILED DESCRIPTION OF THE DRAWINGS

FIG. 1 is a front view of a self-drilling blind rivet of the invention; and

FIG. 2 is a side view of the tension blind rivet of FIG. 1.

DETAILED DESCRIPTION OF THE PREFERRED EMBODIMENT

The blind rivet consists essentially of a rivet casing or sleeve (1) and of a tensioning spindle or shank (2) that has on its one end a drilling unit (3) and on its other end region a force application section (4). At the transition between the tensioning shank (2) and the drilling unit (3), there is an expansion portion (5) that will cause an expansion of the free end of the rivet sleeve (1) when setting the blind rivet into the bore. A stop flange (6) is provided in the usual manner on the rivet sleeve (1).

In the region of the force application section (4) there is at least one protrusion or portion (9), or similar element that protrudes radially over the cross section of the section (2a) of the tensioning shank (2) located in the rivet sleeve (1); this protrusion or other element runs parallel to the axis of the tensioning shank (2).

Section for force application (4) of the tensioning shank (2) has at least one flattening (7). This flattening emanates from its free end and runs across the major part of the length of the free region extending over the rivet sleeve (1). This flattened part of shank (2) is used together with the protrusions (9) for the rotational lock of the tensioning shank (2) during the drilling process. Preferably, the section for force application (4) has an approximately rectangular cross section so that at least two diametrically opposing elongated projections (9), and also two flattenings (7) are formed.

The section (4) for force application of the tensioning shank (2) is provided on at least one partial segment thereof with toughenings, transverse ribs (8), undulations, knobs, or a knurled edge. The transverse ribs (8) or similar features form a special configuration of the tensioning shank (2) in order to better transfer the axial forces when setting the rivet by the tool, without making the clamping jaws of the tool grasping the tensioning shank (2) apply an excessively large force radially against the tensioning shank. One favorable effect, of course, will also be obtained when the corresponding clamping jaws of the tool have a surface corresponding to the roughenings, transverse ribs, undulations, knobs, or knurled edges.

With regard to the shown example it is further provided that the section (4) for force application has a width B, measured transversely to the axial direction, which is greater than the diameter (D) of the tensioning shank (2), and furthermore, a thickness (A) measured at a right angle to that width is smaller khan the diameter (D) of the tensioning shank (2).

In the illustrated embodiment, it is also evident that the width (B) of the section for force application (4) measured parallel to the flattenings (7) is at least 1.2 times the diameter (D) of the tensioning spindle (2). Thus a relatively broad flattening (7) will be possible for the rotational lock during the drilling process. Moreover, even when the transverse ribs (8) are provided along the broad flattenings (7), an optimum force transfer will be possible when setting the rivet.

The production of the section for force application (4) takes place in a very simple manner by flat pressing of the one end region of the tensioning shank (2) after the mounting of the rivet sleeve (1). Thus, after the final assembly of the blind rivet, only the section for force application will have to be shaped by deformation of the tensioning shank (2). During this shaping process, the roughenings, transverse ribs (8), undulations, knobs, or a knurled edge can be produced.

In the illustrated example, the transverse ribs (8) or similar features are provided on the flattenings (7), or at least on one of the two flattenings (7). It would also be possible to use the region of flattenings (7) solely for the transfer of the torque during the drilling process, so that the transverse ribs (8) or similar features could also be provided on one or both protrusions (9) of the section for force application (4). It is also possible to provide only one flattening (7), where the transverse ribs (8) or similar features could be provided to correspond with the cylindrical part lying opposite the flattening (7).

The term "flattening" is intended to mean not only a precisely planar surface; it would also be possible to design the flattenings (7) as slightly cambered so that the section (4) for force application could have a roughly elliptical cross-section, for example. It is also not absolutely required that the cross-section of the section (4) for force application be roughly rectangular. It would be quite possible to design the section (4) for force application having a three- or five-cornered configuration, for example, so that possibly also more than two protrusions (9), or similar features or flattenings (7) would be distributed across the perimeter of the section (4) for force application. Thus it is also possible to provide an asymmetrical cross-section for the section for force application, so that in regular or irregular sequence, bars, protrusions, or similar features, and also channels or grooves can be formed.

The transverse ribs (8) or similar parts can also be provided completely around the perimeter in the region of the section for force application (4).

As already mentioned, one or more channels or grooves can be provided on the tensioning shank (2) parallel to each protrusion (9) or similar feature, or parallel to several protrusions (9), respectively, or similar features at the section (4) for force application.

The protrusions (9), or similar features formed on the section (4), for force application need not cover its entire length, but can also be formed as partial bars or partial protrusions following in sequence in the axial direction.

As has been mentioned in the description, bars, protrusions, or similar features are produced by deformation or by pressing one end region of the tensioning shank. It would also be possible to bend the free end region of the tensioning shank around, for example, by 180°, so that this end region will again extend parallel to the tensioning shank in the opposite direction. This turned end will then form the bar protruding over the cross section of the tensioning shank, so that even then an excellent rotational lock and a large surface for force application will be created during the tensioning motion. In this regard it is also possible to design the end region of the tensioning shank in the shape of a curved eyelet, so that the two diametrically opposing curvatures of such eyelet will run parallel to the axis and form bars or protrusions extending across the cross section of the tensioning spindle.

The drilling unit (3) in the form of a drilling plate (10) is provided in the rivet. The inventive design described herein is not limited to blind rivets with this kind of the drilling unit (3). The drilling unit (3) can be designed in any other manner, where it can be manufactured as a single piece with the tensioning shank (2), or attached by a weld joint, and e.g., designed as a roughly cylindrical drilling part.

I claim:

1. A self-drilling blind tension rivet comprising a rivet sleeve having a stop flange at one end thereof and an expanding part on another end; a drilling unit provided to said another end of said rivet sleeve for drilling a hole in a structure for receiving the rivet; and an elongated rivet shank extending from said stop flange and including a first cylindrical section partially inserted in said rivet sleeve and a second rotation-and-tension force application section for applying from a rotation-and-tension tool to be attached thereto rotation and tension to the rivet for drilling the hole and setting the rivet in said hole, said rotation-and-tension force application section being flattened and formed with two diametrically opposing portions protruding radially beyond an outer diameter of said first cylindrical section of said shank and running from an end thereof in a direction parallel to an axis of elongation of said rivet shank over at least a part of the length thereof, said rotation-and-tension force application section having tool engaging surface-toughening means thereon, said surface-roughening means being formed by ribs extending transversely of said axis, said two diametrically opposing portions defining therebetween two oppositely positioned flattened surfaces each formed in a continuous plane between said radially protruding portions and having said surface-roughening means thereon.

2. The self-drilling blind tension rivet according to claim 1, wherein said second section of said shank has a width measured transversely to said axis, which is greater than said outer diameter of said first section and has a thickness measured at a right angle to said width which is smaller than said outer diameter of said first section.

3. The self-drilling blind tension rivet according to claim 2, wherein said width of said second section is 1.2 times said outer diameter of said first section.

4. The self-drilling blind tension rivet according to claim 1, wherein said second section having said protruding portions is formed by pressing part of said rivet shank after pre-assembling said rivet sleeve thereto.

\* \* \* \* \*